(12) United States Patent
Jenne et al.

(10) Patent No.: US 6,578,791 B1
(45) Date of Patent: Jun. 17, 2003

(54) VARIABLE GRAVITY BIAS CONTROL SYSTEM FOR A GUIDED MISSILE

(75) Inventors: Everett K. Jenne, Ridgecrest, CA (US); H. Lowell Smith, Ridgecrest, CA (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 0 days.

(21) Appl. No.: 06/290,747

(22) Filed: Jul. 30, 1981

(51) Int. Cl.[7] .................................................. F41G 7/22
(52) U.S. Cl. ...................................................... 244/3.15
(58) Field of Search ............................... 244/3.15, 3.16, 244/3.19, 3.2, 3.21, 3.1

(56) References Cited

U.S. PATENT DOCUMENTS

| 2,821,349 A | * | 1/1958 | Sohn .......................... 244/3.15 |
| 3,011,738 A | * | 12/1961 | Skramstad et al. ......... 244/3.15 |
| 3,310,259 A | * | 3/1967 | Swift et al. ................. 244/3.15 |

* cited by examiner

*Primary Examiner*—Charles T. Jordan
(74) *Attorney, Agent, or Firm*—David Kalmbaugh (57) ABSTRACT

A missile flight control initiating device for optimizing flight control time and a variable gravity bias device that corrects guidance signals from the missile's guidance computer during the optimized flight control time. These devices function to correct for the droop in trajectory caused by gravity so that the missile passes above the target.

6 Claims, 7 Drawing Sheets

VARIABLE GRAVITY BIAS CONTROL SYSTEM FOR A GUIDED MISSILE

BACKGROUND OF THE INVENTION

1. Field of the Invention

This invention relates to guided missiles and, more particularly, it relates to a system for making corrections to guidance signals.

Over an extended flight, gravity causes the missile to droop a distance uncorrected for by the guidance. A gravity bias system corrects this error.

2. Description of the Prior Art

Missiles using pursuit guidance navigation such as the Shrike can miss the target through the combined effects of gravity, seeker boresight error, cross winds, and multi-paths. When the missile approaches the target at a shallow angle, the effect of gravity causes the missile to fall short. Missiles such as the Shrike not having a vertical reference cannot correct for the influence of gravity.

For example, the Shrike missile's flight control is not initiated for a fixed period after launch and pressure rate of change has met a defined logic. Using the present logic, flight control is at times initiated too late in the flight for certain launch conditions and as a result the missile does not have enough guidance controlled flight time to steer to the target.

A further problem is a device for measuring air pressure. A wire wound potentiometer pressure transducer has been used in the past. Although its output is linear with pressure to a degree, its output is stepped because of the coarse windings and has a minimum resolution of ±10 pounds per square foot (P.S.F.). Since the output is not truly linear, differention is difficult to perform.

Another problem of past air pressure devices has been its location upon the body of the missile. If it is located near the wings, the pressure varies greatly at lower speeds.

SUMMARY OF THE INVENTION

The present invention relates to a device for initiating flight control and a device which upon said initiation corrects guidance error signals compensating for gravity bias.

After the launch of the missile, flight control is inhibited until a defined set of parameters are satisfied. Once initiated, gravity bias is a constant 2.5° for the first 20 seconds, then gravity bias is a linear function of pressure rate.

The gravity bias circuit uses a pressure transducer having a continuous functional output with respect to the pressure rate. The pressure is differentiated and input into a gravity bias generator. The gravity bias generator outputs a bias signal which is multiplied by the outputs of a 2 degree of freedom gyro used to measure roll angle. The outputs of the gyro are a product of the bias signal and cosine or sine of the roll angle. These outputs are added or subtracted from error signals from the guidance computer. These corrected error signals are input into servos for controlling the missile flight.

One object of this invention is a variable gravity bias device whose output is a continuous function of the pressure rate.

Another object of this invention is a flight control initiating device using selective logic so that the gravity bias device can effectively control the missile.

Another object of this invention is a gravity bias device that uses a plastic potentiometer element in the pressure transducer to give a continuous output.

A further object is a variable gravity bias control system that significantly increases the missile kill probability especially for shallow approaches to the target.

A still further object is a gravity bias control system that increases the envelope in which the missile can be operated.

Other objects, advantages, and novel features of the invention shall become apparent from the following detailed description when considered in conjunction with the drawings and the claims.

DESCRIPTION OF THE PREFERRED EMBODIMENT

Figure 1:
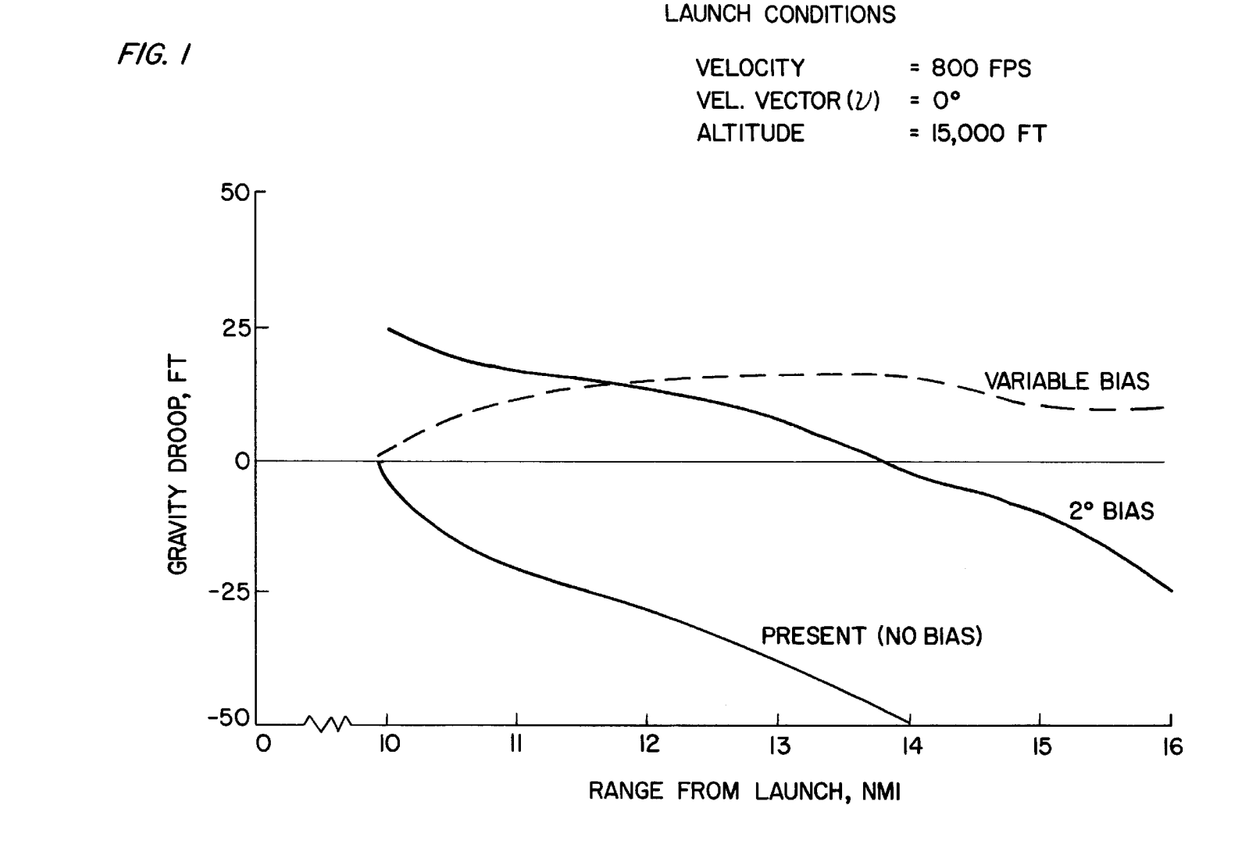
FIG. 1 shows the gravity droop of a missile with and without bias.

Referring to FIG. 1, this illustrates the basic problem to which this invention is directed. A missile without any bias device falls short of the target. The trajectory error causing the short-fall is known as "droop" in the art. The bias curves start at about 10 MIN from launch since the target must be within the operational envelope. Even a missile with a constant bias falls short when it approaches a target at a shallow angle. With a variable gravity bias control system in a missile, the droop is accounted for continually during the flight to a point where the missile would overshoot the target rather than falling short. This is more desirable since a proximity fuze or other types of fuzes can explode the warhead above the target inflicting greater damage.

The prior control logic initiated control too late in the flight for certain launch conditions resulting in the missile not having sufficient guidance controlled flight time to steer to the target. The old logic required that control be inhibited for the first 3 seconds and until the pressure is greater than or equal to 1,047 lb/ft² and until an increase in pressure from its minimum value of 144 lb/ft².

The above logic was replaced with a requirement that control be inhibited until 3 seconds after launch. Further, pressure had to be greater than or equal 1,057 lb/ft² and a positive pressure rate of greater than 20 lb/ft² occurred or pressure is greater than 1500 lb/ft² and a pressure rate of greater than 0 lb/ft²/sec occurred.

To give greater accuracy to pressure measurement, the location of the pressure transducer was moved from under the wing to the forward section of the missile, near the nose, which resulted in almost a liner pressure coefficient from 0.4 to 4 Mach.

Figure 2:
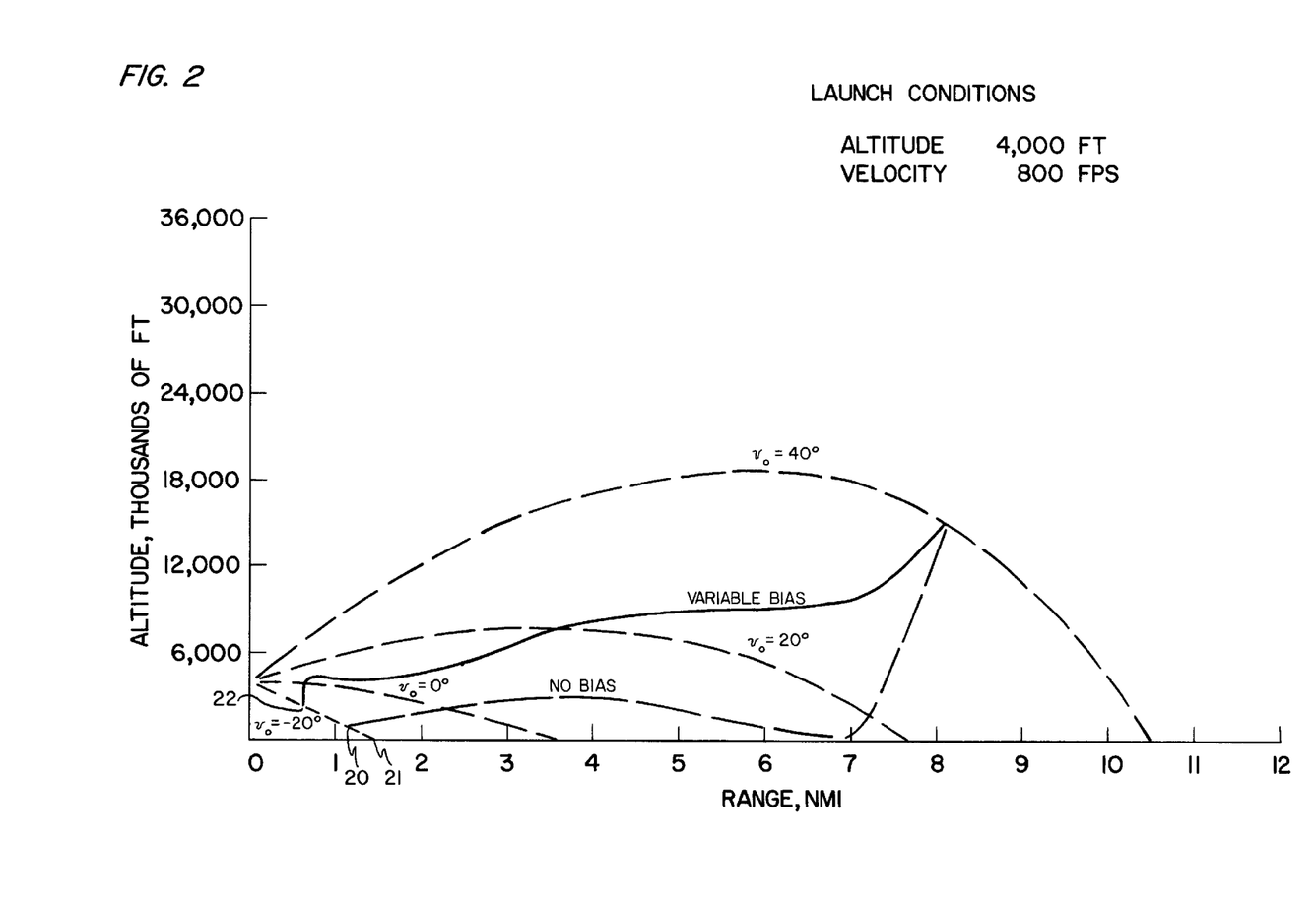
FIG. 2 illustrates when flight control is initiated at a variety of launch angles using a system with or without variable gravity bias.
Figure 3:
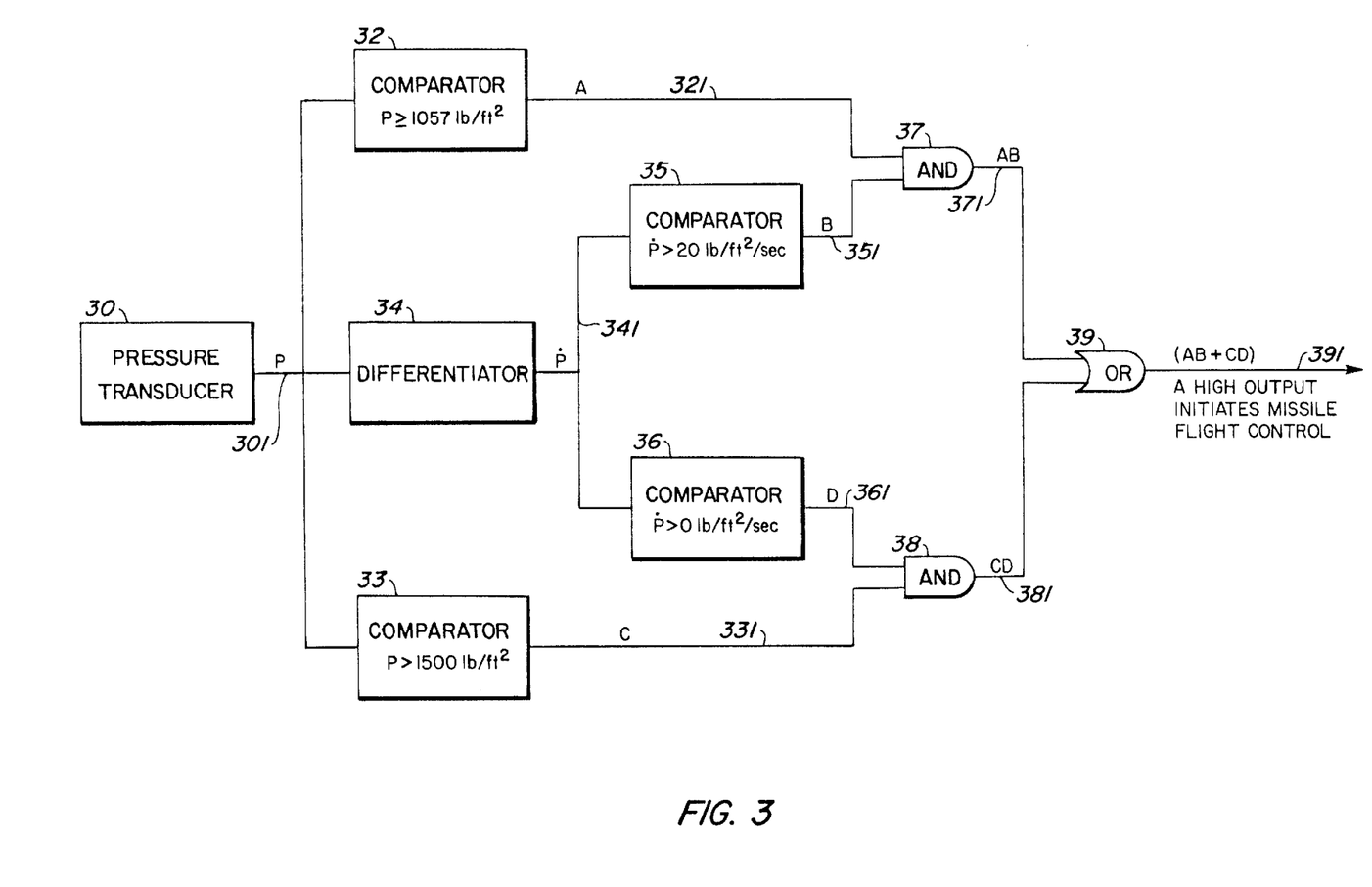
FIG. 3 is a block flow logic diagram of the circuit used to initiate flight control.

Additionally, the wire wound potentiometer was replaced with a potentiometer having a plastic pot element so that output is continuous rather than stepped. This increased the minimum resolution and made possible the differentiation of the pressure. The effect of the change is illustrated in FIG. 2. As an example of the prior logic control failure, FIG. 2 shows that for a launch at 4000 ft., from a 20 degree dive ($v_o=-20°$) by the aircraft prior to launch, missile control is initiated, at point 20, a very short distance from impact at point 21. Using the variable gravity bias control system logic, control is initiated, at point 22, well before missile impact, at point 21. Three other launch angles are plotted in FIG. 2 showing the improvement over the prior logic system. A block flow logic diagram is illustrated in FIG. 3 which implements the criteria noted above.

An output 301 of a pressure transducer 30 is connected to comparing means comprising a first comparator 32, a second comparator 33, and to a differentiator 34. Comparator 32 compares output 301, P, to a reference voltage equivalent to 1,057 pounds per square foot (P.S.F.). For $P \leq 1,057$ PSF, an output 321 of comparator 32 is high. Comparator 33 has an output 331 which is high when P, output 301, is greater than 1500 PSF.

Differentiator 34 has its output 341, $\dot{P}$, connected to third and fourth comparators 35 and 36. Output 351 is high for $\dot{P}$ greater than 20 PSF/sec. and comparator 36 has a high output 361 when $\dot{P}$ is greater than 0 PSF/sec. Comparators 32 and 35 are connected to AND gate 37 and comparators 36 and 33 are connected to AND gate 38. Output 371 of AND gate 37 is high only when both outputs 321 and 351 are high. Output 381 is high only when outputs 361 and 331 are high. Both AND gates are connected to an OR gate 39 and output 391 is high if either outputs 371 or 381 is high. Output 391 of OR gate 39 initiates missile flight control when it is high.

Figure 4:
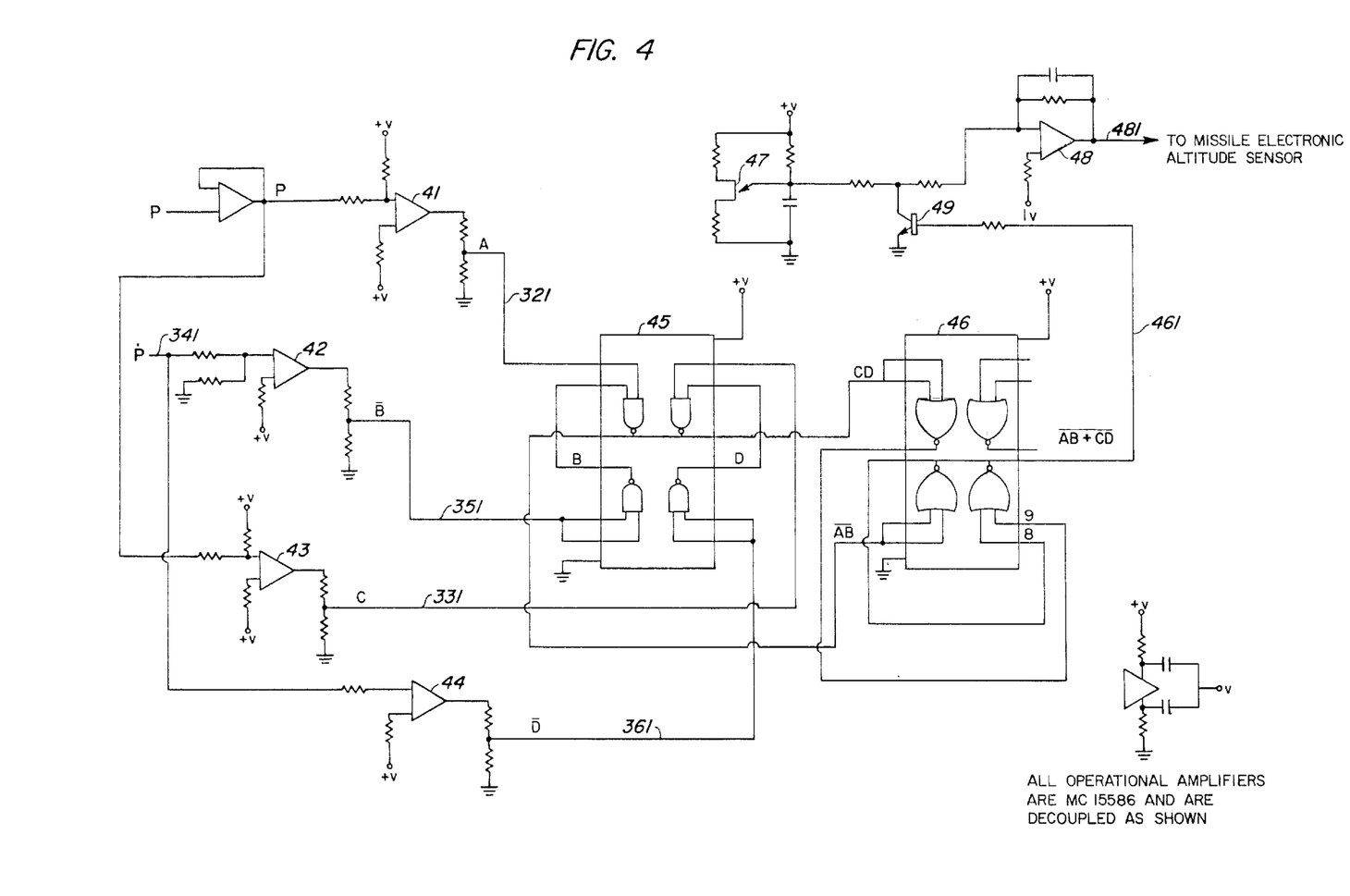
FIG. 4 is a flight control initiating device schematic.

Referring to FIG. 4, this schematic represents one possible way to implement the proposed flight control initiating logic.

Component values or signs are not shown since one skilled in the art is able to determine such knowing the circuit parameters and requirements. Voltage supplies are only indicated by a +V and may be of different values.

First, second, third, and fourth amplifiers 41, 42, 43, and 44 are connected as comparators. Referring back to FIG. 3, it is seen that outputs 321, 351, 331, and 361 switch from a low voltage to a high voltage when the criteria noted there are satisfied. These outputs are attenuated to make them compatible to NAND gates 45. NAND gates 45 and NOR gates 46 adjust the Boolean algebra to satisfy the flight control initiating criteria.

A signal 481 with a sawtooth waveform is fed into an electronic sensor input in order to trigger it on and initiate flight control. This sawtooth signal 481 is generated by a relaxation oscillator consisting of basically a unijunction transistor 47; a fifth amplifier 48 is an inverting amplifier and its input from the relaxation oscillator is controlled by output 461 of NOR gates 46 through a transistor 49. When ($\overline{AB+CD}$) is high, transistor 49 is turned on by output 461 and this inhibits input signal to amplifier 48. When ($\overline{AB+CD}$) switches to a low state the output of amplifier 48 becomes an inverted sawtooth signal that triggers the electronic altitude sensor on and initiates flight control of the missile's wings.

Figure 5:
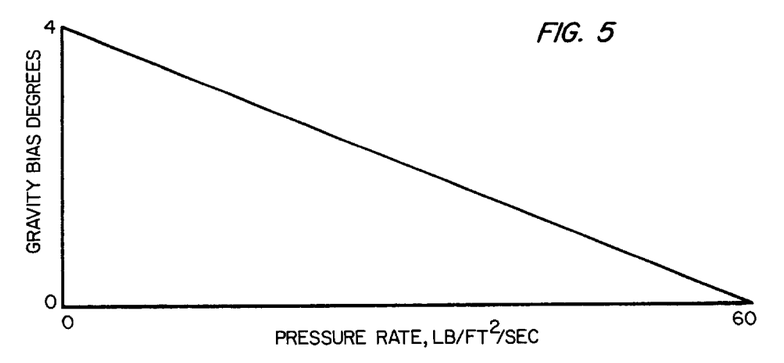
FIG. 5 illustrates the manner of obtaining gravity bias as a function of pressure rate.

Referring to FIG. 5, this illustrates the function of gravity bias versus pressure rate. Note that gravity bias is constant for the first 20 seconds of flight at 2.5°. Whenever flight control is initiated within about 3 seconds after launch, a constant gravity bias for the first part of flight is sufficient to correct for gravity droop; note in FIG. 1 that the constant gravity bias causes the missile to overshoot the target during first part of flight. After this period, a variable gravity bias corrects for the droop and maintains missile above a 0° launch angle trajectory. This applies to other launch trajectories so that the missile does not under shoot the target, but there are launch limitations which define the operational envelope of the missile. The gravity bias system cannot correct for deviations which would otherwise cause the missile to miss the target.

Figure 6:
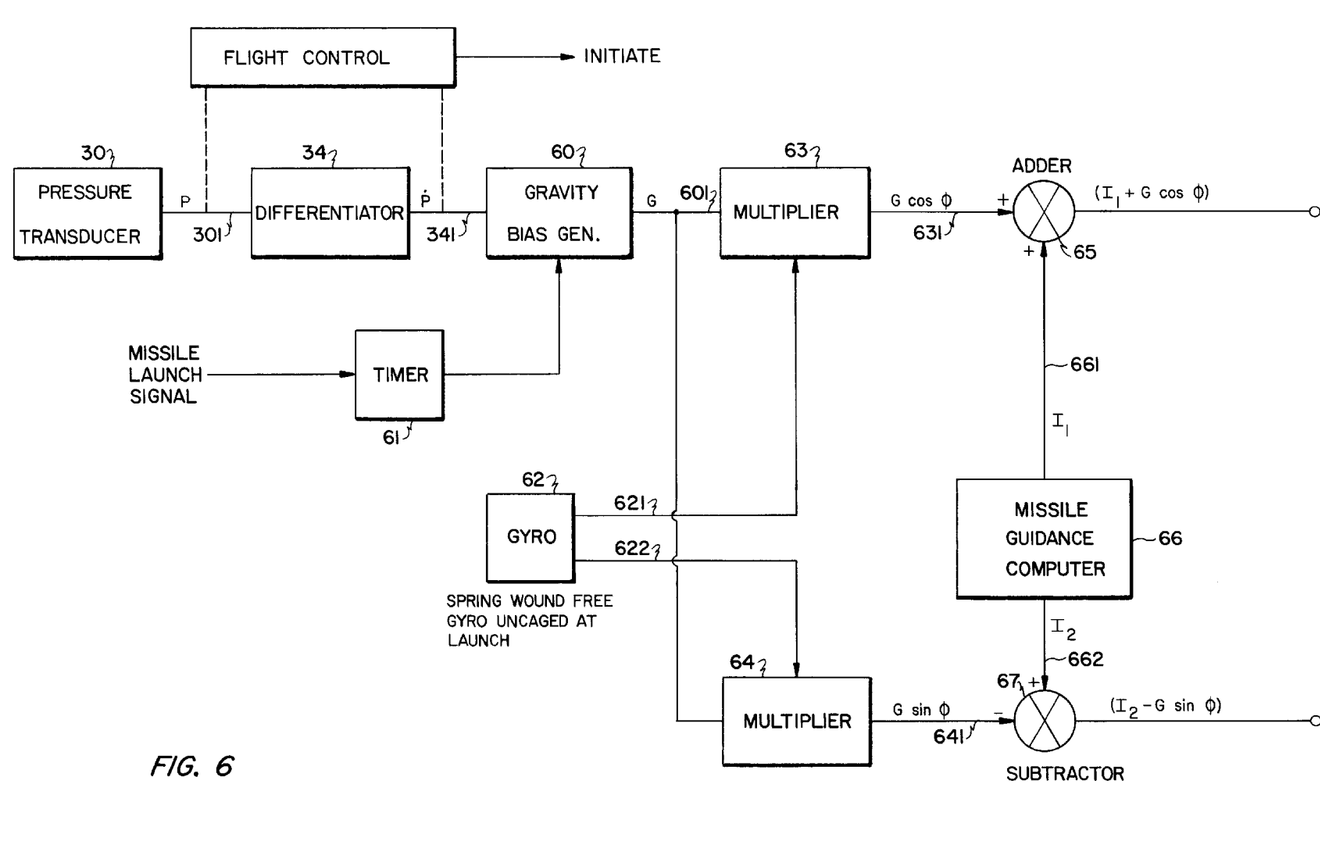
FIG. 6 is a block diagram showing logic flow for the variable gravity bias device.

The gravity bias signal varies according to the logic shown in FIG. 5, and FIG. 6 is a block diagram that shows how this bias is implemented and incorporated in a missile such as Shrike.

Output 301 of pressure transducer 30 is a DC voltage (P) that is differentiated to obtain an output 341 voltage ($\dot{P}$) proportional to pressure rate. The gravity bias generator 60 is controlled by a twenty second timer 61 and acts upon the voltage $\dot{P}$ in such a way that a gravity bias voltage G output 601 is generated according to the logic in FIG. 5.

There are first and second gyro output signals 621 and 622. Output 621 varies according to the cosine of the roll angle $\phi$ and output 622 varies according to the sine of the roll angle $\phi$. The gravity bias voltage G is multiplied by the gyro output 621 cos $\phi$ to form the term (G cos $\phi$) by a first multiplier 63. This output 631 voltage is added by adder 65 to a missile error signal 661 from missile guidance computer 66 to obtain ($I_1$+G cos $\phi$). Similarly, the gravity bias G is multiplied by the gyro output 622 sin $\phi$ to make the product (G sin $\phi$) by a second multiplier 64. This voltage is subtracted by subtractor 67 from a missile error signal 662 for a difference ($I_2$-G sin $\phi$). $I_1$ and $I_2$ are the original missile steering command error signals and ($I_1$+G cos $\phi$) and ($I_2$-G sin $\phi$) are the new steering command signals.

Figure 7:
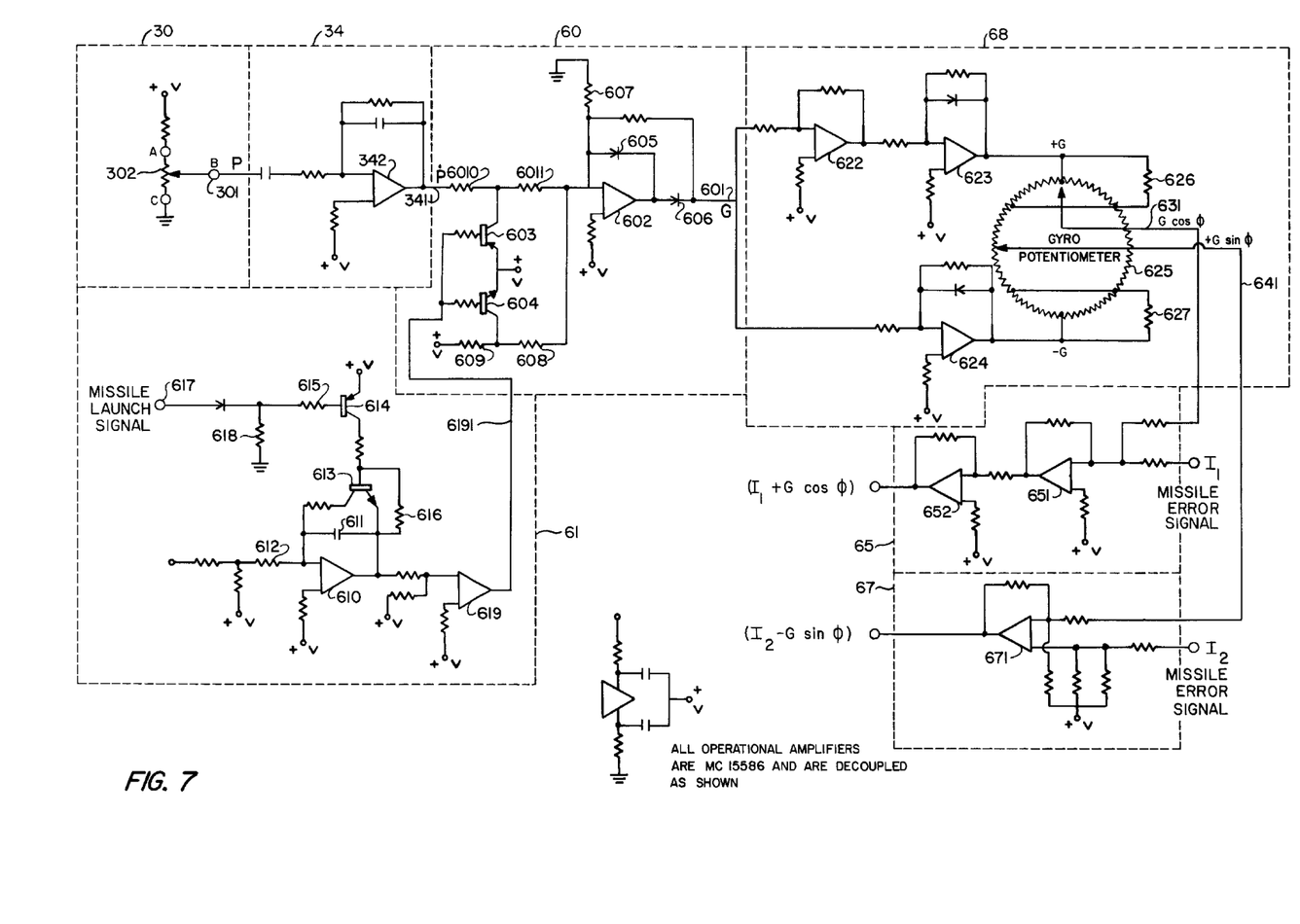
FIG. 7 is a variable gravity bias device schematic.

The Shrike missile does not use negative voltages in its guidance computer. The gyro reference in the computer is +12.0 volts DC and the signals vary above and below this +12.0 volt reference to maximum limits of 0.0 and +24.0 volts. FIG. 7 is the schematic diagram of the variable gravity bias circuit.

Pressure transducer 30 is represented by a 5K potentiometer 302 where terminal A is at 5.0 volts DC and the wiper B varies between 0 and +5.0 volts depending upon the pressure.

An amplifier 342 is connected as a conventional differentiator with time constants at 1.0 second and 0.001 second to filter high frequency noise. The transfer function for this differentiator using Laplace transform notation where p is the generalized frequency variable is $$\frac{R_2 C_1 p}{(1+R_1 C_1 p)(1+R_2 C_2 p)} \quad \text{or} \quad \frac{10p}{(1+p)(1+0.001p)}.$$

In timer 61, an amplifier 610 is connected as an integrator with a constant voltage input. Input resistors form a divider network to supply a 1.0 volt reference to the integrator input. A capacitor 611 and a resistor 612 make up the integrator passive elements and their product is the integrator time base of 3 seconds. A transistor 613 acts as a switch to start the integrator. Transistor 613 is controlled by a transistor 614 through its base resistor 615. When transistor 614 is biased off transistor 613 is also off because its base is returned to its emitter through a resistor 616. The missile launch signal is zero before the missile is launched and +30.0 volts after launch. Before launch the voltage at terminal 617 is zero and transistor 614 is biased on by resistors 615 and 618 returning to ground. At launch the voltage at terminal 617 steps to +30.0 volts, actuates the gyro rotor spin-up spring, not shown, and switches transistor 613 off. Transistor 614 is switched off and the integrator begins operating. The output of the integrator is a ramp that decreases from +12.0 volts to 0.0 volts. An amplifier 619 is connected as a comparator and compares the integrator output to a reference voltage. When the integrator output decays to 5.4 volts, the output of amplifier 619 switches from a low voltage (near ground) to a high voltage (near +24.0 volts). This occurs 20 seconds after launch.

Gravity bias generator 60 uses an amplifier 602 to combine pressure rate input 341, a constant input from the +24.0 volt supply, and a constant input from ground. Transistors 603 and 604 switch on two of these inputs after 20 seconds of flight time upon receiving a time signal 6191. Diodes 605 and 606 limit the output of amplifier 602 to the positive region between +12.0 and +24.0 volts. The input to amplifier 602 from ground through a resistor 607 causes the output of amplifier 602 to change by +8.0 volts (equivalent to 4 degrees of steering command). The input to amplifier 602 from the +24.0 volt supply through resistors 608 and 609 causes an output change of −3.0 volts (equivalent to −1.5 degrees of steering command).

Before (launch+20 seconds) transistor 603 is turned on and transistor 604 off. Transistor 603 inhibits the pressure rate $\dot{P}$ so that it is not an input to amplifier 602. Transistor 604 is off and so there is one input to amplifier 602 from the +24.0 volt supply and another from ground. The sum of these inputs to amplifier 602 multiplied by the gain of amplifier 602 results in an output 601 change of +5.0 volts or 2.5 degrees of steering command signal.

After (launch+20 seconds) transistor 603 is switched off and 604 on. Transistor 604 inhibits the input from the +24.0 volt supply and since transistor 603 is off, the two inputs to amplifier 602 are pressure rate $\dot{P}$ applied through resistors 6010 and 6011 and the ground input through resistor 607. The sum of these inputs multiplied by the gain of amplifier 602 result in the output g being equal to $(8-0.137\dot{P})$ volts $[(4-0.067\dot{P})$ degrees of steering command] where $\dot{P}$ is in pounds per square foot per second. Amplifiers 622, 623, and 624 are used to drive the gyro potentiometer 625. A voltage of +G is applied to the top of the gyro pot and −G to the bottom of the pot. This circuit is a two quadrant multiplier because G is restricted to a positive polarity, which corresponds to the UP direction. The outputs of 631 and 641 of the gyro pot are two products G cos$\phi$ and G sin $\phi$.

Amplifiers 651 and 671 are summing amplifiers that add the missile error signals to the gravity bias terms. The gravity bias terms are divided by factor in the summing process. Amplifier 652 shifts the phase of the signal $-(I_1+G \cos \phi)$ to $(I_1+G \cos \phi)$. The signal (I1+G cos $\phi$) is connected in place of the original missile error signal $I_1$, and $(I_2-G \sin \phi)$ is used in place of $I_2$. The gyro potentiometer used gives a linear output, but is tapped and padded with resistors 626 and 627 in order to shape the output and approximate a sine-cosine winding.

Figure 8:
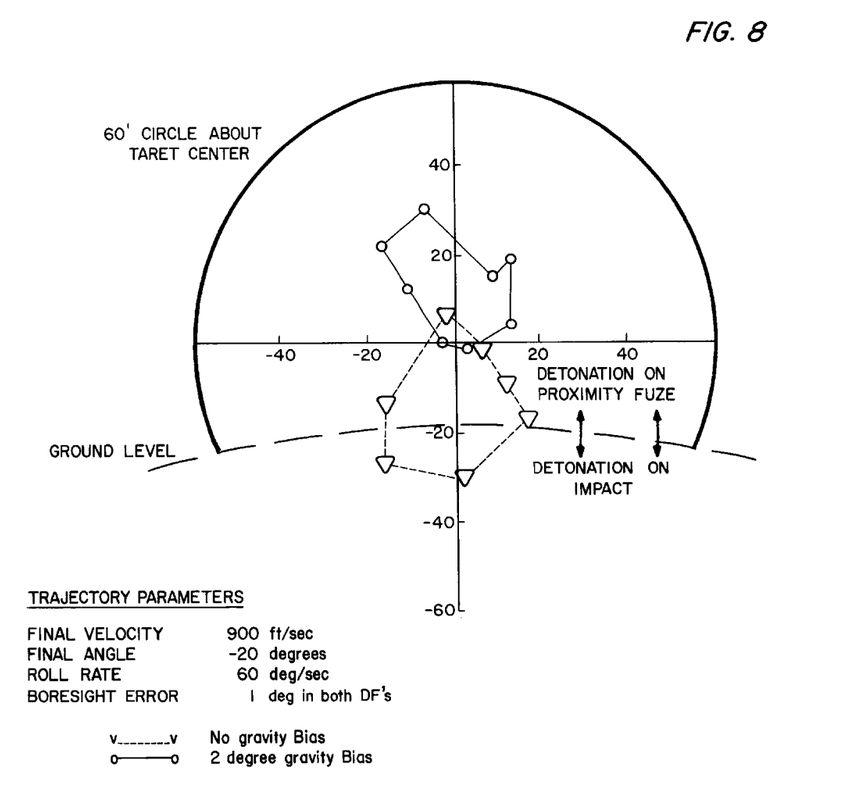
FIG. 8 illustrates the improvement in the closest point of approach.

Referring to FIG. 8 this shows the improvement in the miss distance by comparing the closest points of approach of missiles with bias against missiles without bias. The data shown resulted from a computer run made using a 6-degrees of freedom program.

Obviously many modifications and variations of the present invention are possible in light of the above teachings and it is therefore understood that, within the scope of the disclosed inventive concept, the invention may be practiced otherwise than specifically described.

What is claimed is:

1. A control circuit for an air launched missile comprising:
   a flight control initiating device which includes,
     pressure measuring means for sensing atmospheric pressure, said means having a pressure output signal which is continuous and linear,
     differentiating means connected to said pressure measuring means for determining the rate of change of said pressure output signal and outputting a rate of change pressure signal,
     means for comparing output signals of said pressure measuring means and differentiating means to predetermined values, outputting pulse signals when said output signals equal or exceed predetermined values, and
     gating means for implementing an algorithm to initiate missile flight control, connected to receive pulse signals from said comparing means; and
   a variable gravity bias device connected to said flight control initiating device that corrects guidance signals from a missile guidance computer after flight control is initiated.

2. A circuit control according to claim 1, wherein said comparing means comprises:
   first comparing means for triggering a first output pulse when said pressure input exceeds or equals a first predetermined value;
   second comparing means for triggering a second output pulse when said pressure input exceeds or equals a second predetermined value;
   third comparing means for triggering a third output pulse when said pressure rate of change signal exceeds a third predetermined value; and
   fourth comparing means for triggering a fourth output pulse when said pressure rate of change signal exceeds a fourth predetermined value.

3. A control circuit according to claim 2 wherein said gating means comprises:
   first gating means having NAND gates for receiving said first and third output pulses, outputting a first product pulse;
   second gating means having NOR gates for receiving said second and fourth output pulses from said comparing means, outputting a second product pulse;
   third gating means for summing said first and second product pulses, outputting a sum pulse to initiate missile flight control.

4. A control circuit according to claim 1 wherein said variable gravity device comprises:
   timing means for initiating said gravity bias device, receiving a missile launch signal and having a trigger output after a fixed period of time;
   a gravity bias generator connected to said timing means for receiving said trigger output of said timing means and connected to said differentiating means for receiving said pressure rate of change output of said differentiating means, outputting a gravity bias signal;
   gyro means for determining roll angle attitude of said missile, receiving said gravity bias signal, modifying said gravity bias signal for inputting to gyro potentiometer having a two quadrant multiplier, outputting a first and second signal, said first signal output is a product of said modified gravity bias signal and cosine of the roll angle, and said second signal output is a product of said modified gravity bias signal and sine of the roll angle; and signal combining means for adding and subtracting signals, receiving said first and second signal from said gyro means and error signals from said guidance computer, outputting a first error signal which is a sum of said first signal and a first missile error signal and a second error signal which is a difference between a second missile error signal and said second signal, said error signals inputted into a missile steering device.

5. A control circuit according to claim 4, wherein said gravity bias generator outputs a gravity bias signal ranging from 0 to 4 degrees, in voltage equivalent values, said output having a negative linear slope from 0 to 60 lb/ft$^2$/sec.

6. A control circuit according to claim 5, wherein said output is according to an equation $8-0.137\dot{P}$ (volts).

* * * * *